A. P. HOPKINS.
Improvement in Grading-Plows.

No. 127,239. Patented May 28, 1872.

127,239

UNITED STATES PATENT OFFICE.

ADAM P. HOPKINS, OF BENTLEYVILLE, PENNSYLVANIA.

IMPROVEMENT IN GRADING-PLOWS.

Specification forming part of Letters Patent No. 127,239, dated May 28, 1872.

Specification describing a new and Improved Grading-Plow, invented by ADAM P. HOPKINS, of Bentleyville, in the county of Washington and State of Pennsylvania.

My invention consists in a triangular grading or scraping-plow with certain attachments, whereby it may be readily shifted to turn to the right or left, or to turn both ways alike, without requiring to be turned over, as some have heretofore been.

Figure 1:
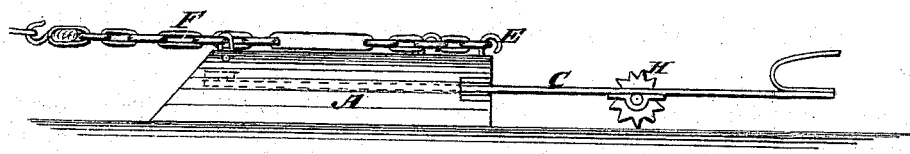
Figure 2:
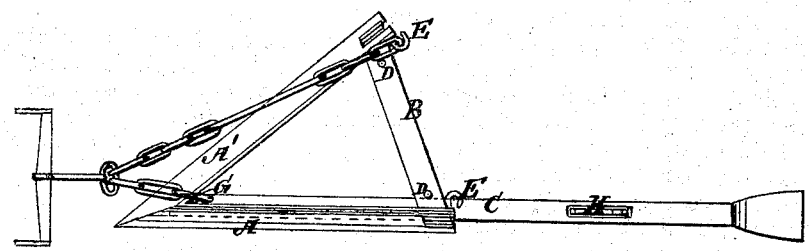
Figure 3:
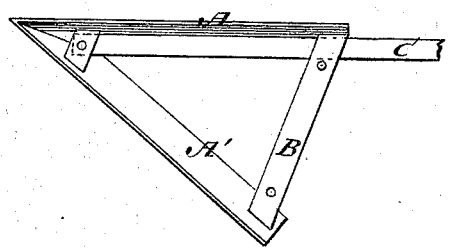

Figure 1 is a side elevation of my improved grading-plow. Fig. 2 is a plan view; and Fig. 3 is a plan of the bottom.

A A' represent the two sides of a triangular scraper, and B the base. C is a long bar, pivoted to the scraper at the apex of the inner angle formed by the two sides, and extending rearward a considerable distance beyond the base, where it is provided with a star or other wheel, H, with points adapted to roll along the ground. This bar may be shifted from side to side, and held at either side by a pin, D, passing through the bar B. E represents a hook on each of the rear corners, and F a draft-chain, adapted to be hooked by one end to one of said hooks, and at the other to the apex of the plow at G. If it be desired to turn the earth to the right, the chain will be hooked onto the right side, as shown, and the bar C will be adjusted to the left. This will, owing to the chain being rightly adjusted as to length, hold the plow in the position indicated in Fig. 2—that is, with the side A in the line of the draft, and the side A' throwing out to the right—and by reversing the chain and bar C the plow will turn the furrow to the left in like manner. To have the plow turn both ways, the chain will not be engaged with either hook E, and the bar C will be allowed to hang by the pivot at the angle of the sides.

Having thus described my invention, I claim as new and desire to secure by Letters Patent—

The improved triangular grading-plow A A' B, with chain F, hooks E, bar C, and guiding-wheel H, all combined and arranged substantially as specified.

ADAM P. HOPKINS.

Witnesses:
   A. J. BUFFINGTON,
   JOHN HOLLAND, Sr.